United States Patent
Michael et al.

(10) Patent No.: US 8,882,901 B2
(45) Date of Patent: Nov. 11, 2014

(54) DISPERSION COMPRISING HYDROPHOBIZED SILICON DIOXIDE PARTICLES, AND PAINT PREPARATION

(75) Inventors: Günther Michael, Karlstein (DE); Wolfgang Lortz, Wächtersbach (DE); Thorsten Ladwig, Hainburg (DE); Tina Gross, Steinau (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/884,322

(22) PCT Filed: Oct. 24, 2011

(86) PCT No.: PCT/EP2011/068526
§ 371 (c)(1),
(2), (4) Date: Jul. 23, 2013

(87) PCT Pub. No.: WO2012/062559
PCT Pub. Date: May 18, 2012

(65) Prior Publication Data
US 2013/0303673 A1    Nov. 14, 2013

(30) Foreign Application Priority Data
Nov. 10, 2010   (DE) .......................... 10 2010 043 721

(51) Int. Cl.
*C09D 1/00*    (2006.01)
*C09D 5/02*    (2006.01)
*C09D 7/12*    (2006.01)
*C08K 5/5419*    (2006.01)
*C09C 1/30*    (2006.01)
*C08K 3/36*    (2006.01)

(52) U.S. Cl.
CPC ........... *C08K 5/5419* (2013.01); *C01P 2006/12* (2013.01); *C09D 5/024* (2013.01); *C09D 7/1225* (2013.01); *C01P 2006/22* (2013.01); *C09D 7/1275* (2013.01); *C01P 2004/62* (2013.01); *C09C 1/3081* (2013.01); *C08K 3/36* (2013.01)
USPC .............. 106/287.26; 106/287.34; 106/287.3; 516/79; 516/87

(58) Field of Classification Search
USPC .......... 106/287.3, 287.34, 287.26; 516/79, 87
See application file for complete search history.

(56) References Cited

U.S. PATENT DOCUMENTS

2007/0145327 A1* 6/2007 Lortz et al. .................... 252/79.1
2008/0044483 A1* 2/2008 Kessell .......................... 424/498
2011/0000397 A1 1/2011 Lortz et al.

FOREIGN PATENT DOCUMENTS

EP    2 107 086    10/2009

OTHER PUBLICATIONS

Kibbey, T. C.G., et al., "A Multicomponent Analysis of the Sorption of Polydisperse Ethoxylated Nonionic Surfactants to Aquifer Materials: Equilibrium Sorption Behavior", Environmental Science and Technology, vol. 31, No. 4, pp. 1171-1177, XP55016448, ( Apr. 1, 1997).
International Search Report Issued Jan. 24, 2012 in PCT/EP11/068526 Filed Oct. 24, 2011.

* cited by examiner

Primary Examiner — Margaret Moore
(74) Attorney, Agent, or Firm — Oblon, Spivak, McClelland, Maier & Neustadt, L.L.P.

(57) ABSTRACT

Aqueous dispersion comprising hydrophobized silicon dioxide particles, comprising
a. 50%-80% by weight of water,
b. 10%-30% by weight of hydrophobized silicon dioxide particles,
c. 5%-15% by weight of at least one alcohol alkoxylate of the general formula $R^1O((CH_2)_mO)_nH$, where
   $R^1$ is a branched or unbranched alkyl or alkenyl radical having 10-25 C atoms, m is 2 or 3 and n is 10-50,
d. 0.5%-5% by weight of at least one amine and/or amino alcohol having a molecular weight of less than 500 and
e. 0%-1% by weight of N-methylpyrrolidone,
all figures for weight percentages being based on the dispersion.
Paint formulation comprising the dispersion.

13 Claims, No Drawings

DISPERSION COMPRISING HYDROPHOBIZED SILICON DIOXIDE PARTICLES, AND PAINT PREPARATION

CROSS-REFERENCES TO RELATED APPLICATIONS

This application is a National Stage of PCT/EP2011/068526 filed on Oct. 24, 2011. This application is based upon and claims the benefit of priority to German Application No. 10 2010 043 721.2 filed on Nov. 10, 2010.

BACKGROUND OF THE INVENTION

The invention relates to an aqueous dispersion and to a paint formulation, both comprising hydrophobized silicon dioxide particles.

Important points associated with the preparation of dispersions are:
i. effective wetting of the fillers and pigments during incorporation. This allows the dispersing times and the input of dispersing energy to be reduced;
ii. often, a very low viscosity of the dispersions is desirable;
iii. after drying, a high degree of gloss is to be achieved;
iv. the sedimentation tendency of the solid phase in the dispersion is to be minimal, even on long-term storage, transport over large distances, and under extreme climatic exposure;
v. there is not to be any flocculation in the dispersion. This is especially important when preparing reproducible shades and using nowadays-customary paint mixing machines;
vi. the dispersion is to be compatible with a large number of additives.

In order to comply with these points, it is usual to add dispersants to the dispersion. A large number of water-soluble dispersants have already been proposed for this purpose. Examples are dispersants based on ionic structures, such as polyphosphates or amphiphilic structures, in other words having defined hydrophobic and hydrophilic blocks, based on nonionic fatty alcohol ethoxylates or alkylphenol ethoxylates and/or their anionically modified derivatives.

To date, however, there are only a few highly filled, low-viscosity, stable aqueous dispersions known that comprise hydrophobized silicon dioxide particles. Highly filled dispersions are desirable since the transport costs can be reduced as a result and since on incorporation into highly filled paint dispersions they are not to be diluted again with products of high water content. DE-A-10316661 discloses a highly filled, low-viscosity dispersion which comprises 5%-50% by weight of hydrophobized silicon dioxide particles and a dispersant of the general formula $R^1CO_2(CH_2CH(Ph)O)_a(C_nH_{2n-x}R^2_xO)_bR^3$. In use, however, this dispersion leads only to moderately permanent coatings.

EP-A-2107086 discloses an aqueous dispersion which comprises hydrophobized silicon dioxide particles, at least one phosphate ester of an ethoxylated alcohol, and a composition having a basic effect. It has now emerged that paint formulations comprising this dispersion exhibit good results only when the dispersion contains significant amounts of N-methylpyrrolidone. N-methylpyrrolidone, however, is an unwanted ingredient in paint formulations, on account of its toxicity.

The technical object of the invention, therefore, was that of providing a stable dispersion which contains only a small proportion of N-methylpyrrolidone or is entirely free from it, and which nevertheless allows a low viscosity with a high solids loading. The dispersion, moreover, is to permit rapid incorporation into aqueous paint formulations, to exhibit good stability on storage, and to allow the development of a structural viscosity in the paint formulation.

The invention provides an aqueous dispersion comprising hydrophobized silicon dioxide particles, which comprises
a. 10%-30% by weight of hydrophobized silicon dioxide particles,
b. 50%-80% by weight of water,
c. 5%-15% by weight of at least one alcohol alkoxylate of the general formula $R^1O((CH_2)_mO)_nH$,
   where, $R^1$ is a branched or unbranched alkyl or alkenyl radical having 10-25 C atoms, m is 2 or 3 and n is 10-50,
d. 0.5%-5% by weight of at least one amine and/or amino alcohol having a molecular weight of less than 500, preferably less than 50-250,
e. 0%-1% by weight of N-methylpyrrolidone, preferably less than 0.5% by weight, more preferably less than 0.1% by weight,
all figures for weight percentages being based on the dispersion.

The dispersion of the invention is free from colour pigments and binders used in the paint industry. In one preferred embodiment, the fraction of hydrophobized silicon dioxide particles is at least 90% by weight, more preferably at least 98% by weight, based on the solids fraction of the dispersion. Especially preferred is an embodiment in which the solid phase of the dispersion consists entirely of hydrophobized silicon dioxide particles.

By hydrophobized is meant that hydroxyl groups on the surface of silicon dioxide particles are reacted with an agent which endows the particles with hydrophobic properties. One suitable measure of the degree of hydrophobicity in this context is supplied by the methanol wettability.

For the determination of the methanol wettability, 0.2 g (±0.005 g) portions of hydrophobic silicon dioxide particles are weighed out into transparent centrifuge tubes. To each weighed portion are added 8.0 ml of a methanol/water mixture with respective methanol concentrations of 10%, 20%, 30%, 40%, 50%, 60%, 70% and 80% by volume. The sealed tubes are shaken for 30 seconds and then centrifuged for 5 minutes at 2500 min$^{-1}$. The sediment volumes are read off, converted to percentages and plotted against the methanol content (% by volume). The point of inflection of the curve corresponds to the methanol wettability. The higher the methanol wettability, the greater the hydrophobicity of the silicon dioxide particles. Particles considered in the context of the invention to be "hydrophobized" are those whose methanol wettability is at least 20% by volume.

It has been found that particularly good paint properties are obtained when the methanol wettability is 20% to 80% by volume. A special preference may be possessed by particles having a methanol wettability of 30% to 60% by volume.

Examples of suitable commercially available hydrophobized silicon dioxide particles which meet this condition include AEROSIL® R972, AEROSIL® R974, AEROSIL® R104, AEROSIL® R106, AEROSIL® R805, AEROSIL® R812, AEROSIL® R812 S, AEROSIL® R202, AEROSIL® R8200 and AEROSIL®R9200, all from Evonik Degussa (Table 1).

The hydrophobized silicon dioxide particles may be obtained more preferably by hydrophobizing of pyrogenically prepared silicon dioxide particles. By pyrogenic are meant particles prepared by flame hydrolysis or flame oxidation. Pyrogenic silicon dioxide particles are described in Ullmann's Encyclopedia of Industrial Chemistry, Vol. A23, page 635, 5th edition, for example. These particles are generally in the form of aggregated primary particles and on their surface have reactive centres which are able to react with a hydrophobizing agent. The hydrophobized silicon dioxide particles used for the dispersion of the invention preferably have a BET surface area of 50-300 m$^2$/g, more preferably one of 70-200 m$^2$/g and very preferably one of 90-150 m$^2$/g.

Particularly suitable hydrophobized silicon dioxide particles are those obtained by reaction with an organosilane, a silazane or a cyclic polysiloxane. This reaction produces silanized silicon dioxide particles in which there is a chemical bond of type O—Si on the surface.

Particularly suitable agents for hydrophobizing include Organosilanes $(RO)_3Si(C_nH_{2n+1})$ and $(RO)_3Si(C_nH_{2n-1})$, with R=alkyl, such as methyl, ethyl, n-propyl, isopropyl, butyl and n=1-20.
Organosilanes $R'_x(RO)_ySi(C_nH_{2n+1})$ and $R'_x(RO)_ySi(C_nH_{2n-1})$, with R and/or R'=alkyl, such as methyl, ethyl, n-propyl, isopropyl, butyl, n=1-20; x+y=3, x=1.2; y=1.2.
Haloorganosilanes $X_3Si(C_nH_{2n+1})$ and $X_3Si(C_nH_{2n-1})$, with X=Cl, Br; n=1-20.
Haloorganosilanes $X_2(R')Si(C_nH_{2n+1})$ and $X_2(R')Si(C_nH_{2n-1})$, with X=Cl, Br, R'=alkyl, such as methyl, ethyl, n-propyl, isopropyl, butyl; R'=cycloalkyl; n=1-20.
Haloorganosilanes $X(R')_2Si(C_nH_{2n+1})$ and $X(R')_2Si(C_nH_{2n-1})$, with X=Cl, Br; R'=alkyl, such as methyl, ethyl, n-propyl, isopropyl, butyl; R'=cycloalkyl; n=1-20.
Organosilanes $(RO)_3Si(CH_2)_m$—R', with R=alkyl, such as methyl, ethyl, propyl; m=0.1-20; R'=methyl.
Organosilanes $(R'')_x(RO)_ySi(CH_2)_m$—R', with R''=alkyl, cycloalkyl, x+y=3; x=1 or 2, y=1 or 2; m=0.1-20; R'=methyl.
Haloorganosilanes $X_3Si(CH_2)_m$—R' with X=Cl, Br; m=0.1-20; R'=methyl.
Haloorganosilanes $RX_2Si(CH_2)_mR'$ with X=Cl, Br; m=0.1-20; R'=methyl.
Haloorganosilanes $R_2XSi(CH_2)_mR'$ with X=Cl, Br; m=0.1-20; R'=methyl.
Silazanes $R'R_2SiNHSiR_2R'$ with R,R'=alkyl, vinyl, aryl.

Cyclic polysiloxanes D3, D4, D5 and their homologues, with D3, D4 and D5 being understood as cyclic polysiloxanes having 3, 4 or 5 units of the type-O—Si(CH$_3$)$_2$, e.g. octamethylcyclotetrasiloxane=D4.

Polysiloxanes or silicone oils of the type
Y—O—[(R$^1$R$^2$SiO)$_m$—(R$^3$R$^4$SiO)$_n$]$_u$—Y, where
R$^1$, R$^2$, R$^3$, R$^4$=independently of one another alkyl, such as $C_nH_{2n+1}$,
n=1-20; aryl, such as phenyl radicals and substituted phenyl radicals, $(CH_2)_n$—NH$_2$, H
Y=CH$_3$, H, $C_nH_{2n+1}$, n=2-20; Si(CH$_3$)$_3$, Si(CH$_3$)$_2$H, Si(CH$_3$)$_2$OH,
Si(CH$_3$)$_2$(OCH$_3$), Si(CH$_3$)$_2$(C$_n$H$_{2n+1}$), n=2-20
m=0, 1, 2, 3, . . . , 100 000,
n=0, 1, 2, 3, . . . , 100 000,
u=0, 1, 2, 3, . . . , 100 000.

Examples of commercially available products are RHODORSIL® OILS 47 V 50, 47 V 100, 47 V 300, 47 V 350, 47 V 500, 47 V 1000, Wacker Silicon Fluids AK 0.65, AK 10, AK 20, AK 35, AK 50, AK 100, AK 150, AK 200, AK 350, AK 500, AK 1000, AK 2000, AK 5000, AK 10000, AK 12500, AK 20000, AK 30000, AK 60000, AK 100000, AK 300000, AK 500000, AK 1000000 or Dow Corning® 200 fluid.

As surface modifiers it is possible with preference to use the following substances: octyltrimethoxysilane, octyltriethoxysilane, dimethyldichlorosilane, hexamethyldisilazane, 3-methacryloyloxypropyltriethoxysilane, hexadecyltrimethoxysilane, hexadecyltriethoxysilane and dimethylpolysiloxane. With particular preference it is possible to use dimethyldichlorosilane. A commercially available powder of hydrophobized silicon dioxide particles that is particularly suitable for the dispersion of the invention is AEROSIL® R972, Evonik Degussa, for example.

It has further been found advantageous if the hydrophobized silicon dioxide particles in the dispersion of the invention have an average particle size d$_{50}$ of not more than 300 nm. Particularly preferred is a range of 100-250 nm.

The liquid phase of the dispersion consists of a single phase. The liquid dispersion phase comprises water, at least one alcohol alkoxylate, at least one amine and/or amino alcohol and optionally in each case an organic solvent, N-methylpyrrolidone, polyethylene glycol, polypropylene glycol and a copolymer derived from maleic acid.

At 50%-80% by weight, water constitutes the main constituent of the dispersion of the invention. Preference may be given to dispersions whose water content is 60%-75% by weight.

In one particular embodiment of the invention, the fraction of the alcohol alkoxylate of the general formula $R^1O((CH_2)_mO)_nH$ is 5%-20% by weight, preferably 8%-15% by weight, based in each case on the fraction of hydrophobized silicon dioxide particles.

The best technical paint results are obtained for one or more compounds of the general formula $R^1O((CH_2)_mO)_nH$ with
R$^1$=CH$_3$(CH$_2$)$_x$CH$_2$O with x=8-18, m=1-4 and n=15-25. Mention may be made explicitly of CH$_3$(CH$_2$)$_{10}$CH$_2$O[(CH$_2$)$_2$O]$_{18}$H, CH$_3$(CH$_2$)$_{12}$CH$_2$O[(CH$_2$)$_2$O]$_{18}$H, CH$_3$(CH$_2$)$_{14}$CH$_2$O[(CH$_2$)$_2$O]$_{18}$H, CH$_3$(CH$_2$)$_{16}$CH$_2$O[(CH$_2$)$_2$O]$_{18}$H, CH$_3$(CH$_2$)$_{10}$CH$_2$O[(CH$_2$)$_2$O]$_{20}$H; CH$_3$(CH$_2$)$_{12}$CH$_2$O[(CH$_2$)$_2$O]$_{20}$H, CH$_3$(CH$_2$)$_{14}$CH$_2$O[(CH$_2$)$_2$O]$_{20}$H, CH$_3$(CH$_2$)$_{16}$CH$_2$O[(CH$_2$)$_2$O]$_{20}$H, CH$_3$(CH$_2$)$_{10}$CH$_2$O[(CH$_2$)$_2$O]$_{23}$H, CH$_3$(CH$_2$)$_{12}$CH$_2$O[(CH$_2$)$_2$O]$_{23}$H, CH$_3$(CH$_2$)$_{14}$CH$_2$O[(CH$_2$)$_2$O]$_{23}$H, and CH$_3$(CH$_2$)$_{16}$CH$_2$O[(CH$_2$)$_2$O]$_{23}$H.

The liquid phase of the dispersion of the invention further comprises amines and/or amino alcohols. Their fraction is preferably 3%-20% by weight, preferably 5%-15% by weight, based in each case of the fraction of hydrophobized silicon dioxide particles.

The dispersion may preferably comprise amino alcohols. Referred to by the expression amino alcohol is a compound which contains at least one amino group and at least one hydroxyl group. The molecular weight of the amino alcohol for use in the present invention is preferably 50-500, more preferably 100-250. Suitable amino alcohols are 2-aminoethanol, 1-aminoethanol, 3-amino-1-propanol, 2-amino-1-propanol, 1-amino-2-propanol, 2-amino-2-methyl-1-propanol, 2-amino-2-methyl-1,3-propanediol, 2-amino-2-hydroxymethyl-1,3-propanediol, 2-(2-aminoethoxy)ethanol, 2-amino-1-butanol, 4-amino-1-butanol, 1-amino-2-butanol, 1-amino-3-butanol, 3-amino-1-butanol, 2-amino-1-cyclohexanol, 3-amino-1-cyclohexanol, 4-amino-1-cyclohexanol, 2-amino-1-(hydroxymethyl)cyclopentane, 2-amino-1-hexanol, 6-amino-1-hexanol, 2-amino-3-methyl-1-butanol, 1-(aminomethyl)cyclohexanol, 6-amino-2-methyl-2-heptanol, 2-amino-3-methyl-1-pentanol, 2-amino-4-methyl-1-pentanol, 2-amino-1-pentanol, 5-amino-1-pentanol, 1-amino-2,3-propanediol, 2-amino-1,3-propanediol, 2-amino-1,3-propanediol, 2-((3-aminopropyl)methylamino)ethanol or mixtures thereof.

In addition there may be amino alcohols of the type $(CH_3)_2NCHR_1CHR_2$—O—[CHR$_3$—CHR$_4$—O]$_n$H, in which R$_1$, R$_2$, R$_3$ and R$_4$ are each H, CH$_3$ or C$_2$H$_5$ and n may be 1-5, it being possible for R$_1$, R$_2$, R$_3$ and R$_4$ in each case to be alike or different, may be used. By way of example, 1-(2-dimethylaminoethoxy)-2-propanol, 1-(1-dimethylamino-2-propoxy)-2-propanol, 2-(1-dimethylamino-2-propoxy)ethanol, 2-(2-dimethylaminoethoxy)ethanol and 2-[2-(2-dimethylaminoethoxy)ethoxy]ethanol
may be part of the dispersion of the invention.

The best technical paint results are obtained with N,N-dialkylalkanolamines such as N,N-dimethylethanolamine and N,N-dimethylisopropanolamine.

The dispersion of the invention may further comprise 0.1%-1.5% by weight of at least one polyethylene glycol and/or polypropylene glycol. Preferred are polypropylene glycols having an average molecular weight (mass average) of 100 or more, more preferably 150-6000.

It has further been found advantageous if the dispersion of the invention further comprises 0.1-1% by weight, based on the fraction of hydrophobized silicon dioxide particles, of at least one copolymer of the general formula I

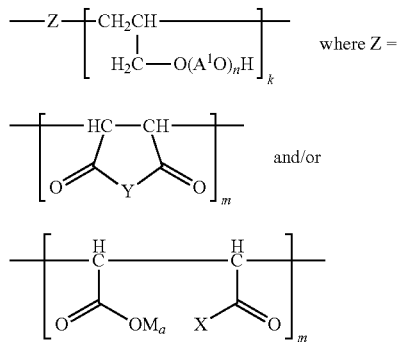

where
M is hydrogen, mono- or divalent metal cation, ammonium ion, organic amine radical,
a is 1, or, if M is a divalent metal cation, a is 0.5
X is likewise —$OM_a$ or —O—$(C_pH_{2p}O)_q$—$R^1$, where
  $R^1$ is H, aliphatic hydrocarbon radical having 1 to 20 C atoms, cycloaliphatic hydrocarbon radical having 5 to 8 C atoms, optionally substituted aryl radical having 6 to 14 C atoms, p=2-4, q=0-100, —$NHR^2$ and/or —$NR^2{}_2$, where $R^2$=$R^1$ or —CO—$NH_2$
Y is O, $NR^2$
$A^1$ is ethylene radical, propylene radical, isopropylene radical, butylene radical,
m is 10-30,
n is 0-50,
k is 10-30, and the sum
m+k is in the range of 20-60, preferably of 20-40.
-($A^1O)_n$— may be a homopolymer of one of the stated alkylene oxides, or a block copolymer or copolymer with statistical distribution of two or more of the monomers in the polymer molecule. The units $[\ ]_m$ and $[\ ]_k$ may likewise be in the form of block copolymers or copolymers with statistical distribution of two or more of the monomers in the polymer molecule.

Finding use as mono- or divalent metal cation M are, preferably, sodium, potassium, calcium and magnesium ions. Organic amine radicals used are preferably substituted ammonium groups deriving from primary, secondary or tertiary $C_1$ to $C_{20}$ alkylamines, $C_1$ to $C_{20}$ alkanolamines, $C_5$ to $C_8$ cycloalkylamines and $C_6$ to $C_{14}$ arylamines. Examples of corresponding amines are methylamine, dimethylamine, trimethylamine, ethanolamine, diethanolamine, triethanolamine, cyclohexylamine, dicyclohexylamine, phenylamine, diphenylamine in the protonated (ammonium) form.

X may denote —$OM_a$ or —O—$(C_pH_{2p}O)_q$—$R^1$ with $R^1$=H, an aliphatic hydrocarbon radical having 1 to 20 C atoms, a cycloaliphatic hydrocarbon radical having 5 to 8 C atoms, an aryl radical having 6 to 14 C atoms, which may optionally be further substituted. p may be from 2 to 4, q=0 to 100, and in one preferred embodiment p=2 or 3, and hence derives from polyethylene oxide or polypropylene oxide. Alternatively, X may also be —$NHR^2$ and/or —$NR^2{}_2$, with $R^2$=$R^1$, or —CO—$NH_2$, corresponding to the mono- or disubstituted monoamides of the corresponding unsaturated carboxylic acid.

Y may be O (acid anhydride) or $NR^2$ (acid imide).

It is possible with preference to use a copolymer of the general formula Ia or Ib, where $A^1$ is an ethylene radical, m is 10 to 30, n is 5 to 20, k is 10 to 30, and where the sum m+k is in the range from 20 to 40.

It is also possible with preference to use compounds having the general formula Ia or Ib in which R is an optionally branched alkyl radical optionally containing multiple bonds and optionally containing hydroxyl groups, and having 8 to 18 C atoms, A is an ethylene radical, M=H or an alkali metal, a is 1 to 30 and b is 1 or 2.

Having emerged as being particularly suitable for technical paint applications is a dispersion which comprises at least one alcohol alkoxylate of the general formula $R^1O((CH_2)_mO)_nH$, at least one polypropylene glycol having an average molecular weight of 100 to 6000 and at least one copolymer of the general formula I. The alcohol alkoxylate/polypropylene glycol/copolymer weight ratios in this case are preferably 50-70/15-30/10-20, and add up to 100.

The dispersion of the invention may further comprise up to 10% by weight of at least one organic solvent, with the exception of N-methylpyrrolidone. The solvent is preferably selected from the group consisting of aliphatic, cycloaliphatic and aromatic hydrocarbons, alcohols, glycols, glycol ethers, ketones, esters and ethers. Mention may be made explicitly of n-hexane, n-heptane, cyclohexane, toluene, xylene, ethylbenzene, cumene, styrene, dichloromethane, 1,2-dichloroethane, methanol, ethanol, 1-propanol, 2-propanol, 1-butanol, isobutanol, 2-ethylhexanol, cyclohexanol, diacetone alcohol, acetone, methyl ethyl ketone, methyl isobutyl ketone, diisobutyl ketone, cyclohexanone, mesityl oxide, isophorone, methyl acetate, ethyl acetate, butyl acetate, butyl ether, isobutyl acetate, methylglycol acetate, butylglycol acetate, ethyl diglycol acetate, butyl diglycol acetate, methoxypropyl acetate, ethoxypropyl acetate, ethylene carbonate, propylene carbonate, diethyl ether, methyl tert-butyl ether, tetrahydrofuran, dioxane, 1-methoxy-2-propanol, 1-ethoxy-2-propanol, 1-isopropoxy-2-propanol, 1-isobutoxy-2-propanol, ethylglycol, propylglycol, butylglycol, ethyldiglycol, butyldiglycol, methyldipropylene glycol, ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, tripropylene glycol, hexanediol, octanediol and triethylene glycol. Particular preference may be given to diethylene glycol, dipropylene glycol and tripropylene glycol.

Finally, defoamers and preservatives as well may be added to the dispersion of the invention. Their fraction in the dispersion is generally below 1% by weight.

Suitable dispersing apparatus for preparing the dispersion of the invention is any apparatus which is capable of allowing intense wetting of the hydrophobic powder with the aqueous phase. Within the paint industry it is popular for this purpose to use dissolvers, whose relatively simple construction allows a low-maintenance, easy-to-clean production regime. Depending on the required viscosity or else degree of filling of the aqueous dispersion to be produced, however, an intense dispersing or aftergrinding is necessary. Aftergrinding may take place, for example, in agitated ball mills. In many cases, however, intense shearing using rotor/stator machines is sufficient. One useful combination of wetting and dispersing capability is provided by the rotor/stator machines from the company Ystral, which allow the powder to be drawn in under suction and to be dispersed with an intense shearing action after the powder intake aperture has been closed.

Particularly when using rotor/stator machines, in which air may be drawn in under suction and there may therefore be foaming, it has proven to be advantageous to include only a portion of the required water and the additives in the initial charge and to incorporate a portion of the hydrophobic silicon dioxide. Above a certain amount of hydrophobic silicon dioxide, approximately 25%-30% by weight, based on the total hydrophobic silicon dioxide to be incorporated, its defoaming action must be ascertained. Only after the addition of the total amount of powder are, finally, the remaining fractions of water added. In this way, a sufficient volume is maintained for the initial foaming at the beginning of addition of the powder in the preparation vessel.

The invention further provides a paint formulation which comprises the dispersion.

Suitable binders in this context may be the resins that are customary in paint and coating technology, as are described in, for example, "Lackharze, Chemie, Eigenschaften and Anwendungen [Paint resins, Chemistry, Properties and Applications]", edited by D. Stoye, W. Freitag, Hanser Verlag, Munich, Vienna 1996.

Examples to be mentioned include the polymers and copolymers of (meth)acrylic acid and their esters, with or without further functional groups, with further olefinically unsaturated compounds, such as, for example, styrene, polyether polyols, polyester polyols, polycarbonate polyols, polyurethane polyols and epoxy resins, and also any desired mixtures of these polymers as well, and also fatty acid-modified alkyd resins prepared by polycondensation are described.

As polymer components it is additionally possible to use organic compounds which carry hydroxyl groups, as for example polyacrylate, polyester, polycaprolactone, polyether, polycarbonate and polyurethane polyols, and hydroxyfunctional epoxy resins, and also any desired mixtures of these polymers can be used. In particular, aqueous or solventborne or solvent-free polyacrylate polyols and polyester polyols and also any desired mixtures thereof are used.

Polyacrylate polyols are copolymers of monomers having groups including hydroxyl groups, with other olefinically unsaturated monomers, such as, for example, esters of (meth) acrylic acid, styrene, alpha-methylstyrene, vinyltoluene, vinyl esters, mono- and dialkyl esters of maleic and fumaric acid, alpha-olefins and further unsaturated oligomers and polymers.

The preparation of the invention may further comprise colour pigments and/or inert fillers.

The colour pigments may be organic or inorganic in nature. Examples include barium sulphate, lead oxides, lead silicates, iron oxides, phthalocyanine complexes, titanium dioxides, zinc oxides and zinc sulphide.

The preparation of the invention may further comprise inert fillers. Inert fillers are fillers known to the skilled person that do not, or not substantially, influence the rheological properties of the preparation. Examples include calcium carbonate, diatomaceous earth, mica, kaolin, chalk, quartz and talc.

Colour pigments and/or inert fillers are present typically in fractions totalling 10% to 70% by weight, preferably 30% to 50% by weight, based on the overall solids fraction of the preparation.

The overall solids fraction of the preparation, composed of hydrophobized silicon dioxide particles, binders and optionally colour pigments and inert fillers, is preferably 40% to 60% by weight, based on the preparation.

The invention further provides for the use of the dispersion as an addition to water-based primer-surfacers in the automotive industry, as a coating constituent in can-coating and coil-coating processes, and as an additive in water-based UV-curable formulations.

EXAMPLES

Dispersions 1-4 are prepared by first mixing the liquid components of the dispersion, using a dissolver. Then AEROSIL® 972, Evonik Degussa, is added with stirring, first subjected to preliminary dispersion by means of a dissolver at 4000 rpm, over a period of 5 minutes, and then dispersed by means of an Ultra-Turrax at 7000 rpm over a period of 30 minutes. After that, an AEROSIL® 972 content of 20% by weight is set using additional water.

The composition of the dispersions and their physicochemical properties are shown in Table 2. Dispersion 1 represents an inventive dispersion.

In spite of the high solids content, inventive dispersion 1 has a low viscosity at room temperature 24 hours after its preparation. Even on storage over 4 weeks at 40° C., there is only an insignificant increase in viscosity. In the case of dispersions 2 and 3, the preparation of a highly filled dispersion fails, since the preparation becomes pastelike. Dispersion 4 as well is unsuitable for a paint formulation, since in the storage test at 40° C. it exhibits a sharp increase in viscosity after just four weeks. Under these conditions, inventive dispersion 1 exhibits a negligible increase in viscosity.

Testing of Dispersions in a Primer-Surfacer

The mill base (Table 3) is premixed and dispersed in an SL 5 bead mill for 20 minutes (1 mm glass beads, 3000 rpm, to grindometer value <10 μm). The resin mixture (Table 4) is premixed using a paddle stirrer. The resin mixture and the dispersed mill base are premixed using a dissolver. The dispersion and the remainder of the water are added with stirring (Table 5). The pH is then adjusted to about 8.6, using DMEA (10% in water).

The measurement of the viscosity of the primer-surfacer is carried out after 4 weeks of storage at 23° C. The yield tests were carried out for 120 s with a shear rate of 500 s$^{-1}$ and 300 s with a shear rate of 0.5 s$^{-1}$. A yield curve is intended to show how rapidly the viscosity, determined using the flow curves, is re-established when the shear rate changes rapidly. In the case of ideal structural viscosity, the viscosity ought to rise immediately as soon as the shear rate falls, and ought to exhibit a constant value. A somewhat delayed build-up of viscosity is desired, since it helps to obtain better flow-out of the paint/varnish.

The sedimentation behaviour of the primer-surfacer is determined 4 weeks after storage at 23° C. The height of sediment is measured, and the percentage ratio between sediment and supernatant phase is calculated.

The yield curves reveal that, in the case of the preparation based on a dispersion with 1% by weight of AEROSIL® R 972, a viscosity increase occurs again rapidly.

TABLE 1

Silicon dioxide powders, suitable for preparing the inventive dispersion

| AEROSIL ® | Hydrophobizing agent | BET surface area* | Methanol wettability |
|---|---|---|---|
| R104 | Octamethylcyclotetrasiloxane | 150 | 40 |
| R106 | Octamethylcyclotetrasiloxane | 250 | 45 |
| R202 | Polydimethylsiloxane | 100 | 75 |
| R805 | Octylsilane | 150 | 45 |
| R812 | Hexamethyldisilazane | 260 | 50 |
| R812S | Hexamethyldisilazane | 220 | 60 |
| R972 | Dimethyldichlorosilane | 110 | 45 |
| R974 | Dimethyldichlorosilane | 170 | 45 |
| R8200 | Hexamethyldisilazane | 160 | 65 |
| R9200 | Dimethyldichlorosilane | 170 | 30 |

*in $m^2/g$; approximate values

TABLE 2

Composition of the dispersions and their physicochemical properties

| Dispersion | | 1 | 2[5)] | 3[6)] | 4 |
|---|---|---|---|---|---|
| Water | g | 500.0 | 550.7 | 509.8 | 509.8 |
| Mixture 1[1)] | g | 78.0 | — | — | — |
| Tego ® Dispers 740 W[2)] | g | — | 27.3 | — | — |
| Tego ® Dispers 745 W[3)] | g | — | — | 68.2 | — |
| Tego ® Dispers 750 W[4)] | g | — | — | — | 68.2 |
| DMEA | g | 18.0 | 18.0 | 18.0 | 18.0 |
| Tripropylene glycol | g | 9.0 | 9.0 | 9.0 | 9.0 |
| Byk 011 | g | 2.7 | 2.7 | 2.7 | 2.7 |
| Surfynol ® 104 E | g | 2.7 | 2.7 | 2.7 | 2.7 |
| AEROSIL ® R 972 | g | 183.9 | 183.9 | 183.9 | 183.9 |
| Total | g | 794.3 | 794.3 | 794.3 | 794.3 |
| Additional water | g | 105.7 | 105.7 | 105.7 | 105.7 |
| Total | g | 900.0 | 900.0 | 900.0 | 900.0 |
| pH | | 10.5 | — | — | 10.3 |
| $\eta^{7)}$ 24 h, 20° C. | | | | | |
| 1 $s^{-1}$ | mPas | 82 | — | — | 55 |
| 10 $s^{-1}$ | | 70 | | | 41 |
| 100 $s^{-1}$ | | 61 | | | 28 |
| $\eta^{7)}$ 4 weeks, 40° C. | | | | | |
| 1 $s^{-1}$ | mPas | 100 | — | — | 2000 |
| 10 $s^{-1}$ | | 80 | | | 1000 |
| 100 $s^{-1}$ | | 55 | | | 500 |
| $d_{50}$[8)] | μm | 0.125 | — | — | 0.127 |
| $d_{90}$[8)] | μm | 0.221 | — | — | 0.234 |

[1)]65% by weight water, 23% by weight, in total, $CH_3(CH_2)_{16}CH_2O[(CH_2)_2O]_{x18}H$ with x = 18, 20, 23; 8% by weight polypropylene glycol and 4% by weight compound of the formula Ib, MW 15000;
[2)]fatty acid alkoxylate; Evonik Tego Chemie;
[3)]modified acrylate; Evonik Tego Chemie;
[4)]styrene-maleic anhydride copolymer; Evonik Tego Chemie;
[5),6)]experiment discontinued, AEROSIL ® could not be added completely owing to excessive viscosity;
[7)]viscosity determined at 23° C. with MCR 300 from Paar Physica, shear rates 1 $s^{-1}$, 10 $s^{-1}$, 100 $s^{-1}$;
[8)]determined using Coulter LS;

TABLE 3

Mill base composition

| Bayhydrol ® D270[1)] | g | 3.76 |
|---|---|---|
| Demineralized water | g | 7 |
| DMEA[2)] | g | 0.53 |
| Surfynol ® 104 E[3)] | g | 0.48 |
| BYK-011 | g | 0.89 |
| Tronox ® RF-D-I | g | 9.64 |
| Bayferrox ® 308T[1)] | g | 0.11 |

TABLE 3-continued

Mill base composition

| Blanc fixe Micro | g | 9.7 |
|---|---|---|
| Talc IT extra | g | 2.37 |

[1)]from Bayer;
[2)]N,N-dimethylethanolamine; 10% by weight in water;
[3)]Air Products;

TABLE 4

Composition of resin mixture

| Bayhydrol ® D270[1)] | g | 4.01 |
|---|---|---|
| Bayhytherm ® 3146[1)] | g | 19.29 |
| Bayhytherm ® VP LS 2153[1)] | g | 22.17 |
| Cymel 327[2)] | g | 4.54 |
| BYK 346 | g | 0.52 |
| DMEA[3)] | g | 1.00 |
| Demineralised water | g | 4.00 |

[1)]from Bayer;
[2)]from Cytec;
[3)]N,N-dimethylethanolamine; 10% by weight in water

TABLE 5

Primer-surfacers (PS)

| | | Inventive | Comparative |
|---|---|---|---|
| Dispersion 1 | G | 5.00 | 0 |
| Water | G | 4.09 | 8.09 |
| Total primer-surfacer | G | 99.1 | 98.1 |
| Conc. of silica | % by weight | 1 | 0 |
| pH* | | 8.4 | 8.0 |
| Grindometer value | μm | 12 | 12 |
| Sedimentation behaviour of PS** | % | 14 | 56 |
| Viscosity increase in yield test (0.5 $s^{-1}$) | mPas | 950 | 200 |

*adjust to pH of approximately 8.6 using DMEA (10% in water);
**after storage for 4 weeks at RT (supernatant in %)

The invention claimed is:

1. An aqueous dispersion, comprising:

50%-80% by weight of water;

10%-30% by weight of hydrophobized silicon dioxide particles;

5%-15% by weight of at least one alcohol alkoxylate of the formula:

$R^1O((CH_2)_mO)_nH$;

0.5%-5% by weight of at least one component selected from the group consisting of an amine and an amino alcohol having a molecular weight of less than 500;

0%-1% by weight of N-methylpyrrolidone;

0.1-1.5% by weight of at least one of polyethylene glycol and polypropylene glycol;

wherein the weight percentages are based on the total weight of the dispersion;

and 0.1-1% by weight, based on the total weight of the hydrophobized silicon dioxide particles, of at least one copolymer of the formula (I):

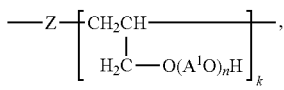

(I)

wherein:
R¹ represents a branched or unbranched alkyl or alkenyl radical comprising 10-25 C atoms;
m' represents 2 or 3;
n' represents 10-50;
Z represents:

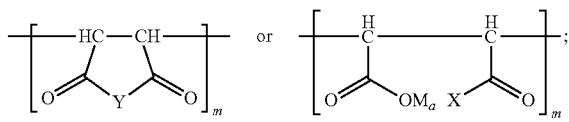

either M is hydrogen, a mono- or divalent metal cation, an ammonium ion, or an organic amine radical and a is 1, or M is a divalent metal cation and a is 0.5;
X represents: $-OM_a$, $-O-(C_pH_{2p}O)_q-R^4$, $-NHR^2$, or $NR^2_2$;
R⁴ represents H, an aliphatic hydrocarbon radical comprising 1 to 20 C atoms, a cycloaliphatic hydrocarbon radical comprising 5 to 8 C atoms, or optionally a substituted aryl radical comprising 6 to 14 C atoms;
p represents 2-4;
q represents 0-100;
R² represents R¹ or $-CO-NH_2$;
Y represents O or $NR^2$;
m represents 10-30;
A¹ represents an ethylene radical, a propylene radical, an isopropylene radical, or a butylene radical;
n represents 0-50;
k represents 10-30; and
the sum m+k is in a range of 20-60.

2. The dispersion according to claim 1, wherein the hydrophobized silicon dioxide particles have a methanol wettability of from 30% to 60% by volume.

3. The dispersion according to claim 1, wherein the hydrophobized silicon dioxide particles are silanized silicon dioxide particles.

4. The dispersion according to claim 1, wherein the hydrophobized silicon dioxide particles are of pyrogenic origin.

5. The dispersion according to claim 1, wherein the hydrophobized silicon dioxide particles have an average particle size $d_{50}$ in the dispersion of not more than 300 nm.

6. The dispersion according to claim 1, wherein the at least one alcohol alkoxylate of the formula $R^1O((CH_2)_mO)_nH$ is present in an amount of from 5% to 20% by weight based on the total weight of the hydrophobized silicon dioxide particles.

7. The dispersion according to claim 1, wherein:
R¹ represents $CH_3(CH_2)_xCH_2O$ such that x=8-18; and
n' represents 15-25.

8. The dispersion according to claim 1, wherein the at least one of the amine and amino alcohol is present in an amount of from 3% to 20% by weight, based on the total weight of the hydrophobized silicon dioxide particles.

9. The dispersion according to claim 1, comprising the amino alcohol.

10. The dispersion according to claim 1, further comprising:
up to 10% by weight of at least one organic solvent,
wherein the at least one organic solvent is not N-methylpyrrolidone.

11. A paint formulation, comprising the dispersion according to claim 1.

12. A composition, comprising the dispersion according to claim 1,
wherein the composition is
an addition to a water-based primer-surfacer,
a coating constituent, or
an additive in a water-based UV-curable formulation.

13. The dispersion according to claim 5, wherein the hydrophobized silicon dioxide particles have an average particle size $d_{50}$ in the dispersion of from 100 to 250 nm.

* * * * *